US009320201B2

(12) United States Patent
Duncan et al.

(10) Patent No.: US 9,320,201 B2
(45) Date of Patent: Apr. 26, 2016

(54) REFLECTIVE ARTICLES AND METHODS FOR INCREASING PHOTOSYNTHESIS

(71) Applicant: Elwha LLC, Bellevue, WA (US)

(72) Inventors: William D. Duncan, Kirkland, WA (US); Roderick A. Hyde, Redmond, WA (US); Muriel Y. Ishikawa, Livermore, CA (US); Lowell L. Wood, Jr., Bellevue, WA (US)

(73) Assignee: Elwha LLC, Bellevue, WA (US)

(*) Notice: Subject to any disclaimer, the term of this patent is extended or adjusted under 35 U.S.C. 154(b) by 0 days.

(21) Appl. No.: 14/137,089

(22) Filed: Dec. 20, 2013

(65) Prior Publication Data

US 2015/0173302 A1    Jun. 25, 2015

(51) Int. Cl.
| | |
|---|---|
| *A01G 13/02* | (2006.01) |
| *A01G 1/00* | (2006.01) |
| *G02B 27/14* | (2006.01) |
| *G02B 5/124* | (2006.01) |
| *G02B 5/02* | (2006.01) |
| *A01G 9/24* | (2006.01) |
| *G02B 19/00* | (2006.01) |

(52) U.S. Cl.
CPC ............. *A01G 1/001* (2013.01); *G02B 5/0236* (2013.01); *G02B 5/0257* (2013.01); *G02B 5/0294* (2013.01); *G02B 5/124* (2013.01); *G02B 27/143* (2013.01); *A01G 9/243* (2013.01); *G02B 19/0042* (2013.01); *Y02P 60/124* (2015.11)

(58) Field of Classification Search
CPC . A01G 13/02; A01G 13/043; A01G 13/0256; A01G 13/00; A01G 13/0268; G02B 27/143; G02B 5/124; G02B 19/0042; G02B 5/0236; G02B 5/0257; G02B 5/0294; Y02P 60/124
USPC .......................... 47/20.1, 29.1, 29.4, 58.1 LS
See application file for complete search history.

(56) References Cited

U.S. PATENT DOCUMENTS

| | | | |
|---|---|---|---|
| 2,203,274 A | 6/1940 | Anderson et al. | |
| 3,089,280 A | 5/1963 | Klaas | |
| 3,120,445 A | 2/1964 | Donald Aluisi et al. | |
| 4,359,737 A | 11/1982 | Bond | |
| 5,656,360 A * | 8/1997 | Faykish et al. | 428/195.1 |
| 6,110,867 A * | 8/2000 | Glenn et al. | 504/119 |
| 6,525,662 B1 * | 2/2003 | Ford | 340/573.1 |
| 6,565,982 B1 * | 5/2003 | Ouderkirk et al. | 428/457 |

(Continued)

FOREIGN PATENT DOCUMENTS

| | | | | |
|---|---|---|---|---|
| JP | 2012-050384 A | 3/2012 | | |
| WO | WO2012029921 A1 * | 9/2011 | | A01G 13/02 |

OTHER PUBLICATIONS

Machine translation of WO 2012/029921 A1.*

(Continued)

*Primary Examiner* — Monica Williams
*Assistant Examiner* — Michael Wang
(74) *Attorney, Agent, or Firm* — Foley & Lardner LLP

(57) ABSTRACT

Provided is a reflective article including a first reflecting material and a second retro reflecting material; where sunlight that is photosynthetically active is at least partially reflected by the article and sunlight that is not photosynthetically active is at least partially retro reflected by the article. Also provided is a method for growing a plant, where the method includes placing the reflective article under, around, or in the proximity of the plant.

30 Claims, 5 Drawing Sheets

(56) References Cited

U.S. PATENT DOCUMENTS

| | | | |
|---|---|---|---|
| 7,058,982 B2* | 6/2006 | Atallah et al. ................... 2/102 |
| 7,762,019 B2* | 7/2010 | Van Rensburg et al. ....... 47/29.1 |
| 7,937,187 B2* | 5/2011 | Kaprielian ................... 700/284 |
| 7,947,793 B2 | 5/2011 | Marchand et al. |
| 8,016,467 B2* | 9/2011 | Eberwein ..................... 362/497 |
| 8,171,668 B2* | 5/2012 | Lais et al. ..................... 47/29.1 |
| 8,501,313 B2* | 8/2013 | Aruga et al. ................. 428/328 |
| 8,615,925 B2* | 12/2013 | Usami ..................... 47/58.1 LS |
| 8,727,545 B2* | 5/2014 | Agashe ........................ 359/536 |
| 2006/0115615 A1 | 6/2006 | Schultz et al. |
| 2007/0184274 A1* | 8/2007 | Wheatley et al. .......... 428/411.1 |
| 2008/0120901 A1* | 5/2008 | Hinsperger ................... 47/20.1 |
| 2009/0155864 A1 | 6/2009 | Bauer et al. |
| 2009/0247406 A1 | 10/2009 | De Corte et al. |
| 2010/0186294 A1* | 7/2010 | Vitale et al. ................ 47/58.1 R |
| 2010/0195201 A1* | 8/2010 | Minoura et al. ............. 359/452 |
| 2010/0298515 A1 | 11/2010 | Marchand et al. |
| 2010/0299993 A1* | 12/2010 | Lais et al. ..................... 47/29.4 |
| 2011/0003262 A1 | 1/2011 | Frantz et al. |
| 2011/0013253 A1* | 1/2011 | Ji et al. ......................... 359/244 |
| 2011/0015354 A1 | 1/2011 | Marchand et al. |
| 2011/0015363 A1 | 1/2011 | Marchand et al. |
| 2011/0054121 A1 | 3/2011 | Marchand et al. |
| 2011/0060103 A1 | 3/2011 | Marchand et al. |
| 2011/0088314 A1* | 4/2011 | Jacobs ........................... 47/32.3 |
| 2011/0117632 A1 | 5/2011 | Woerlee et al. |
| 2011/0159177 A1 | 6/2011 | Van Nijnatten |
| 2011/0197503 A1* | 8/2011 | Usami ..................... 47/58.1 LS |
| 2011/0265378 A1* | 11/2011 | Callaway ..................... 47/1.1 R |
| 2012/0036623 A1* | 2/2012 | Minogue .......................... 2/463 |
| 2012/0063752 A1* | 3/2012 | Cochran ....................... 392/416 |
| 2012/0174477 A1 | 7/2012 | Kleinwaechter |
| 2013/0005022 A1 | 1/2013 | Morris |
| 2013/0276364 A1* | 10/2013 | Langhorst ........................ 47/1.4 |
| 2014/0069002 A1* | 3/2014 | Morgan et al. ........... 47/58.1 LS |
| 2014/0090293 A1* | 4/2014 | Walker .................... 47/58.1 LS |
| 2014/0347731 A1* | 11/2014 | Tillotson et al. .............. 359/529 |
| 2015/0309228 A1* | 10/2015 | Vasiliev et al. ............... 136/257 |

OTHER PUBLICATIONS

"Visible SPectrum", Wikipedia, <http://en.wikipedia.org/wiki/Visible_spectrum>.*

PCT International Search Report; International Ap. No. PCT/US2014/069822; Mar. 27, 2015; pp. 1-5.

Cohen et al., "Effect of Increasing Reflectance on Yield, Growth, and Physiological Behavior of a Dryland Cotton Crop", Crop Science, 1979, vol. 19, pp. 863-868.

Glenn et al., "Particle Film Application Influences Apple Leaf Physiology, Fruit Yield, and Fruit Quality", J. Amer. soc. Hort. Sci., 2001, vol. 126, pp. 175-181.

Stanhill et al., "Effect of Increasing Foliage and Soil Reflectivity on the Yield and Water Use Efficiency of Grain Sorghum", Agronomy Journal, 1976, vol. 68, pp. 329-332.

* cited by examiner

REFLECTIVE ARTICLES AND METHODS FOR INCREASING PHOTOSYNTHESIS

BACKGROUND

The present technology relates generally to articles and methods for growing plants.

Photosynthesis, also called carbon fixation, is the process by which plants utilize solar energy to synthesize carbohydrates and other organic molecules from carbon dioxide and water. Carbohydrates and other molecules are synthesized, according to the photosynthetic capacity of the plant, to meet the needs of the growing plant tissues including the woody tissue, leaf tissue, developing flower buds and developing fruit.

The effects of enhanced photosynthesis generally include improved crops and increased yields, e.g., increased fruit size or production (usually measured in weight per hectare or acre), improved color, increased soluble solids, e.g., sugar, acidity, etc., and reduced plant temperature.

Conversely, the effects of a depleted or insufficient photosynthetic capacity generally include diminished crop yields, decreases in productivity, and "excessive fruit drop." Normal fruit drop occurs when the photosynthetic capacity of the plant is sufficient during the growing season to simultaneously support tree growth, fruit development, and the initiation of flower buds. Excessive fruit drop occurs when photosynthetically derived carbohydrates become limiting to all the growing tissues while fruit is developing. In response, the plant aborts and drops the developing fruit, and limits the initiation of flower buds.

Articles and methods are needed to maintain or bolster the photosynthetic capacity of plants and increase agricultural yields and the quality of crops. An additional need exists, in view of an increasing demand for organic produce, for articles and methods that increase agricultural yields without treating the plant directly with chemical additives.

SUMMARY

The present technology provides a reflective article for reflecting photosynthetically active bands of sunlight towards one or more plants, and methods for growing plants where the method includes placing the reflective article under, around or in the proximity of the plants.

According to one aspect, the present technology provides a reflective article including one or more diffuse reflecting materials and one or more retro reflecting materials; where sunlight that is photosynthetically active is at least partially diffuse reflected by the article and sunlight that is not photosynthetically active is at least partially retro reflected by the article. In some embodiments, the article is configured for placement under, around, or in the proximity of the plant. In some embodiments, when the article is under, around or in the proximity of a plant, sunlight that is photosynthetically active is at least partially diffuse reflected towards leaves of a plant by the article and sunlight that is not photosynthetically active is at least partially retro reflected away from the leaves of the plant by the article. As such, at least some of the sunlight that is not photosynthetically active is retro reflected back towards the sun, whereas at least some of the sunlight that is photosynthetically active is diffuse reflected towards the plant.

In another aspect, the present technology provides a method for growing a plant, the method including placing a reflective article under, around or in the proximity of a plant, wherein the reflective article is as described herein.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The skilled artisan will understand that the drawings primarily are for illustrative purposes and are not intended to limit the scope of the inventive subject matter described herein.

DETAILED DESCRIPTION

Figure 1A:
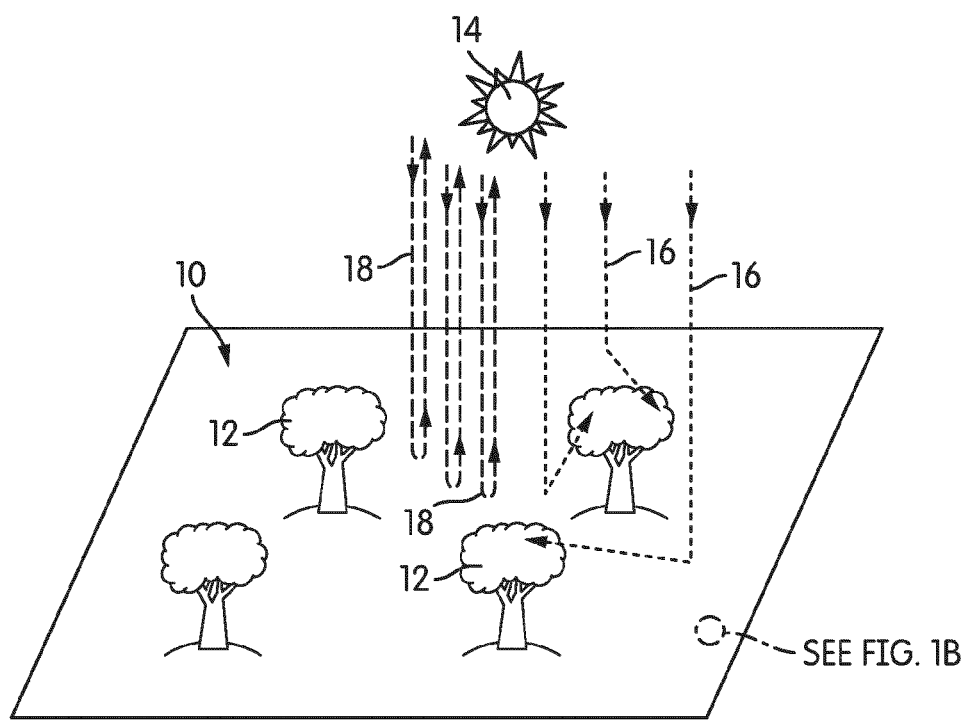
FIGS. 1A-1B illustrate, in accordance with an embodiment, a reflective article as described herein, that has been placed under, around or in the proximity of trees, where relatively intense overhead sunlight that is photosynthetically active is at least partially diffuse reflected by the article towards the trees, and relatively intense overhead sunlight that is not photosynthetically active is highly retro reflected by the article away from the trees.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1B:
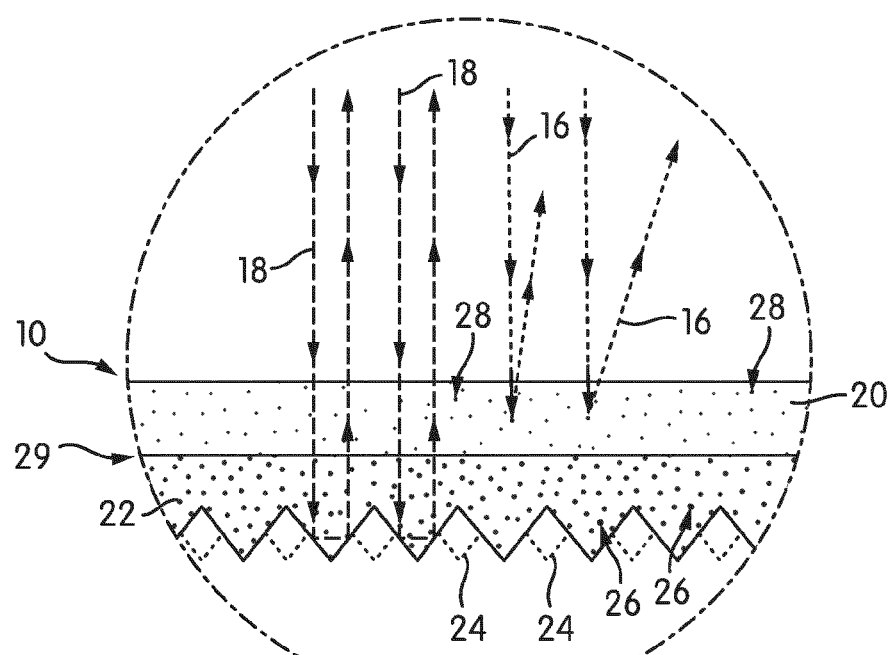

Referring to FIGS. 1A-1B, in accordance with one embodiment, an illustration is provided of a reflective article 10, as described herein, that has been placed around and beneath trees 12. In accordance with one embodiment, the sun 14 in FIGS. 1A-1B is directly over the trees 12 as it would be at approximately noon, the sunlight in FIGS. 1A-1B is relatively intense, substantially all of the sunlight that is photosynthetically active 16 is diffuse reflected by the diffuse reflecting material 20 of article 10 towards the leaves of the trees 12, and substantially all of the sunlight that is not photosynthetically active 18 is retro reflected by the retro reflecting material 22 of article 10 away from the leaves of the trees 12. Partition 29, shown as a dashed line, is optional. Thus, the reflective article can be one or more layers. Corner-cubes 24 retro-reflect photosynthetically inactive light 18. Particles 26 and 28 optionally include diffuse reflecting materials, such as a metamaterial, liquid crystal, photochromic material, thermochromic material, or a combination thereof, which diffuse reflect photosynthetically active light 16.

Figure 2A:
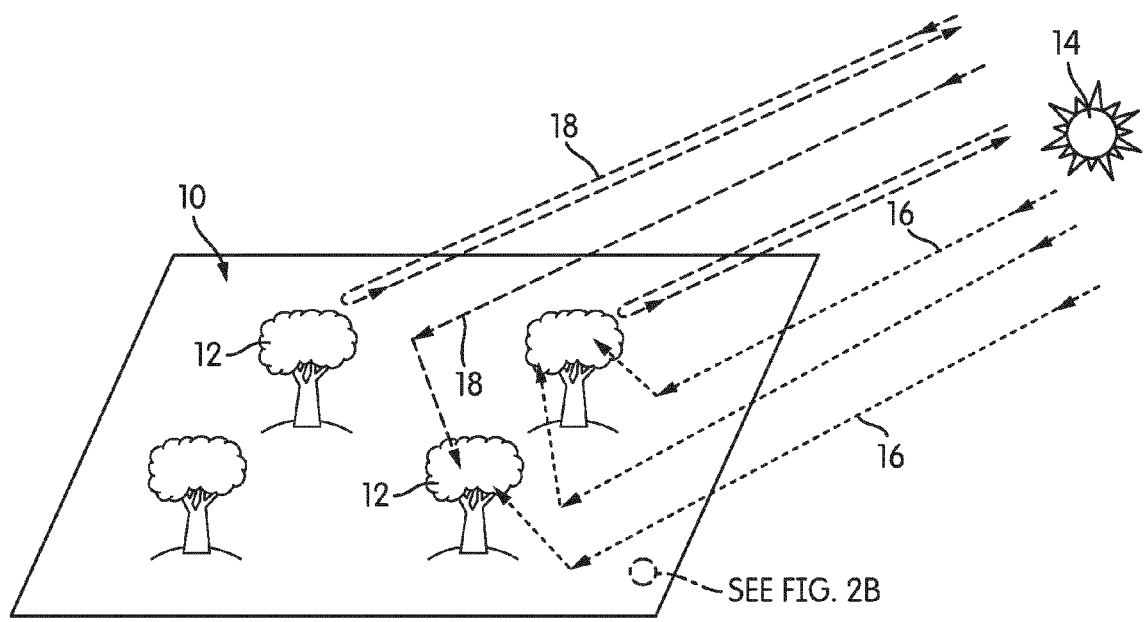
FIGS. 2A-2B illustrate, in accordance with an embodiment, a reflective article as described herein, that has been placed under, around or in the proximity of trees. Relatively mild non-overhead sunlight that is photosynthetically active is at least partially diffuse reflected by the article towards the trees, and relatively mild non-overhead sunlight that is not photosynthetically active is minimally retro reflected by the article away from the trees.
Figure 2B:
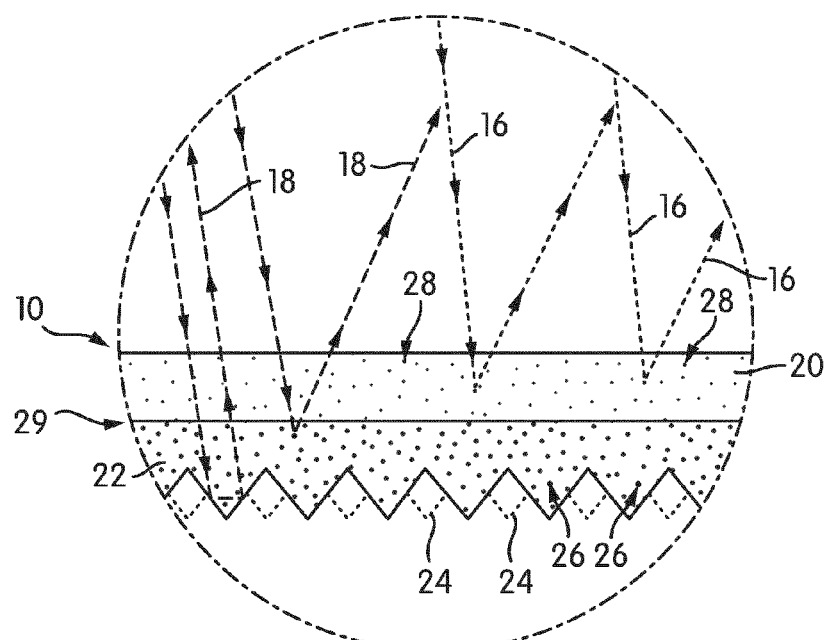

Referring to FIGS. 2A-2B, in accordance with one embodiment, an illustration is provided of a reflective article 10, as described herein, that has been placed around and beneath trees 12. In accordance with one embodiment, the sun 14 in FIGS. 1A-1B is not directly over the trees 12 as would be so in the morning or late afternoon, the sunlight in FIGS. 2A-2B is relatively mild, substantially all of the sunlight that is photosynthetically active 16 is diffuse reflected by the diffuse reflecting material 20 of article 10 towards the leaves of the trees 12, some of the sunlight that is not photosynthetically active 18 is retro reflected by the retro reflecting material 22 of article 10 away from the leaves of the trees 12, and some of the relatively mild sunlight that is not photosynthetically active 18 is diffuse reflected by retro reflecting material 22 of article 10 towards the leaves of the trees 12. Partition 29, shown as a dashed line, is optional. Thus, the reflective article can be one or more layers. Corner-cubes 24 retro-reflect photosynthetically inactive light 18. Particles 26 and 28 optionally include diffuse reflecting materials such as a metamaterial, liquid crystal, photochromic material, thermochromic material or a combination thereof, which diffuse reflect photosynthetically active light 16.

Figure 2C:
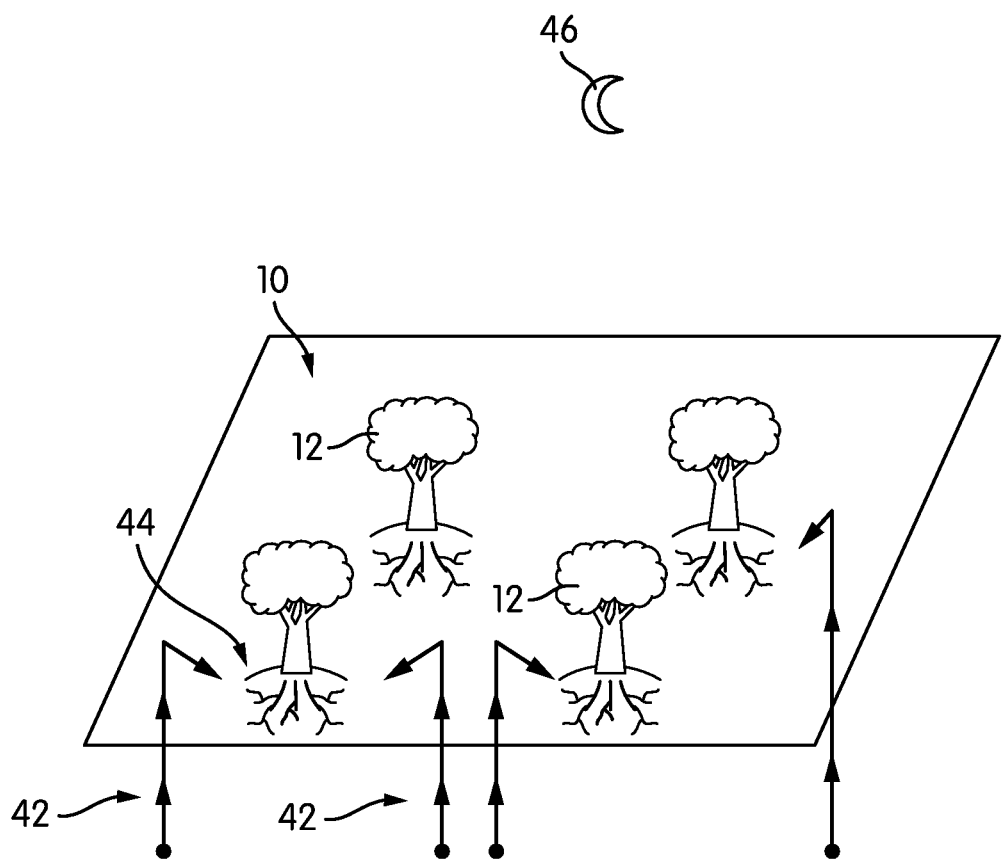
FIG. 2C illustrates, in accordance with an embodiment, a reflective article as described herein, that has been placed as a ground cover under, around or in the proximity of trees, where the ground cover decreases the thermal emissivity of the ground that it covers.

Referring to FIG. 2C, in accordance with one embodiment, an illustration is provided of a reflective article 10 that has been placed as a ground cover around trees 12, where the ground cover decreases the thermal emissivity 42 of the ground that it covers and retains temperature in the ground and roots 44 of the trees 12.

Figure 3:
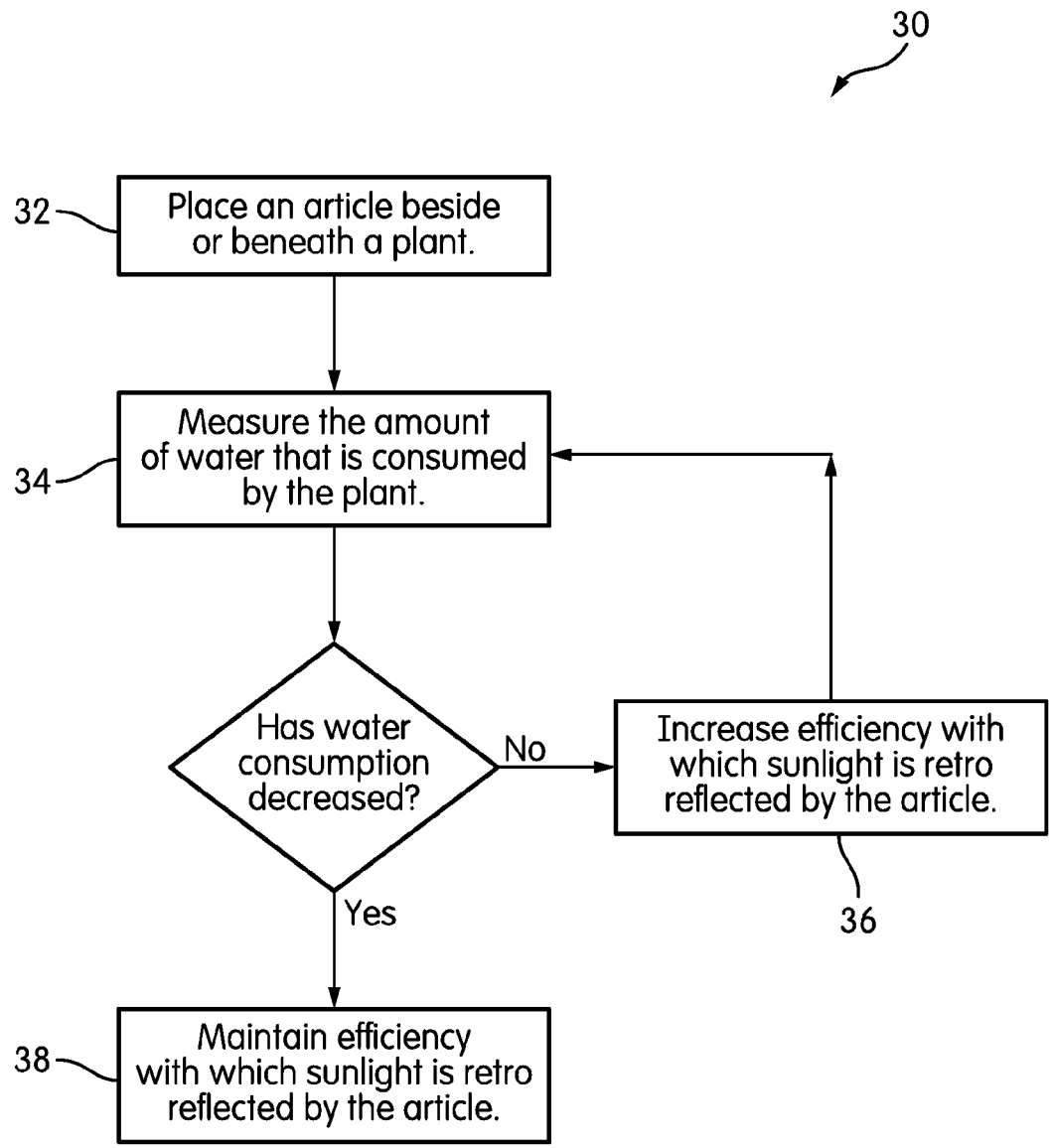
FIG. 3 illustrates, in accordance with one embodiment, a method for growing a plant, the method including placing a reflective article beside or beneath the plant, wherein the reflective article is as described herein.

Referring to FIG. 3, a flowchart depicts a process 30 for growing a plant and using a reflective article, as described herein, to decrease the amount of water that is consumed by a plant. A reflective article is first placed beside or beneath a plant as described herein (step 32). According to one embodiment, a base measurement is taken of the amount of water that is consumed by the plant (step 34). The efficiency is increased with which the article retro reflects sunlight (that is not photosynthetically active) away from the plant if the amount of water that is consumed by the plant has not decreased (step 36). The efficiency is maintained with which the article retro reflects sunlight (that is not photosynthetically active) away from the plant if the amount of water that is consumed by the plant has decreased (step 38).

Figure 4:
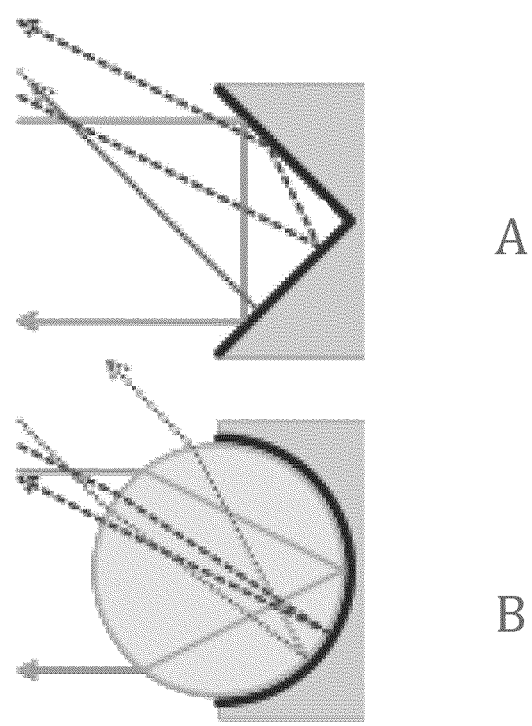
FIG. 4A illustrates, in accordance with one embodiment, a retro-reflector based on a corner cube element.
FIG. 4B illustrates, in accordance with one embodiment, a retro-reflector having refracting optical elements with a reflective surface as described herein.

Referring to FIG. 4A, a retro-reflector based on a corner cube element is shown.

Referring to FIG. 4B, a retro-reflector having refracting optical elements with a reflective surface is shown.

The technology is described herein using several definitions, as set forth throughout the specification.

The use of the terms "a" and "an" and "the" and similar referents in the context of describing the elements (especially in the context of the following claims) are to be construed to cover both the singular and the plural, unless otherwise indicated herein or clearly contradicted by context.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In some embodiments, the light may be sunlight or artificial light.

The present technology relates generally to reflective layers and reflective materials for increasing photosynthesis in plants capable of photosynthetic activity. As used herein, the term plant refers to an organism capable of synthesizing complex organic material utilizing, but not limited to, carbon dioxide, water, inorganic salts, and light energy captured by light-absorbing pigments, such as but not limited to chlorophyll and other accessory pigments. Plants are photoautotrophs and are able to create their own food directly from inorganic compounds using light energy.

In some embodiments, the photosynthetic process consists of light reactions and dark reactions, whereby carbon dioxide ($CO_2$), water ($H_2O$), and light energy are used to synthesize an energy-rich carbohydrate. In a general case, the carbohydrate produced is glucose ($C_6H_{12}O_6$), with an oxygen by-product.

Pigments are chemical compounds which reflect only certain wavelengths of visible light. Pigments can reflect light and can absorb certain wavelengths. The ability to absorb only certain wavelengths of light is useful to plants and other autotrophs that make their food using photosynthesis. Plants, algae, and cyanobacteria use pigments as the means by which the light energy is captured for photosynthesis. Each pigment reacts with a specific narrow range of the electromagnetic spectrum; thus, a photosynthetic organism may produce several different pigments in order to increase its light energy capture.

As used herein, the term "chlorophyll" is used to describe a biomolecule that is critical in photosynthesis, and which allows organisms to absorb energy from light. Chlorophyll absorbs light most strongly in the blue portion, and to a lesser degree, in the red portion of the electromagnetic spectrum. The green color of chlorophyll is due to the biomolecule's poor absorption of green and near-green light. Chlorophyll is structurally similar and produced through the same metabolic pathway as other porphyrin pigments such as heme, an iron compound of protoporphyrin constituting the pigmental or protein-free part of the hemoglobin molecule, responsible for the molecule's oxygen-carrying properties. The most widely distributed form that occurs in terrestrial plants is chlorophyll a.

Table 1 lists representative chlorophyll structures.

TABLE 1

|  | Chlorophyll a | Chlorophyll b | Chlorophyll c1 | Chlorophyll c2 | Chlorophyll d | Chlorophyll f |
|---|---|---|---|---|---|---|
| Mol. Formula | $C_{55}H_{72}O_5N_4Mg$ | $C_{55}H_{70}O_6N_4Mg$ | $C_{35}H_{30}O_5N_4Mg$ | $C_{35}H_{28}O_5N_4Mg$ | $C_{54}H_{70}O_6N_4Mg$ | $C_{55}H_{70}O_6N_4Mg$ |
| C2 group | —$CH_3$ | —$CH_3$ | —$CH_3$ | —$CH_3$ | —$CH_3$ | —CHO |
| C3 group | —CH=$CH_2$ | —CH=$CH_2$ | —CH=$CH_2$ | —CH=$CH_2$ | —CHO | —CH=$CH_2$ |
| C7 group | —$CH_3$ | —CHO | —$CH_3$ | —$CH_3$ | —$CH_3$ | —$CH_3$ |

TABLE 1-continued

|  | Chlorophyll a | Chlorophyll b | Chlorophyll c1 | Chlorophyll c2 | Chlorophyll d | Chlorophyll f |
|---|---|---|---|---|---|---|
| C8 group | —$CH_2CH_3$ | —$CH_2CH_3$ | —$CH_2CH_3$ | —CH=$CH_2$ | —$CH_2CH_3$ | —$CH_2CH_3$ |
| C17 group | $CH_2CH_2COO$-Phytyl | $CH_2CH_2COO$-Phytyl | CH=CHCOOH | CH=CHCOOH | $CH_2CH_2CO$ | $CH_2CH_2COO$-Phytyl |
| C17-C18 bond | Single (chlorin) | Single (chlorin) | Double (porphyrin) | Double (porphyrin) | Single (chlorin) | Single (chlorin) |
| Occurrence | Universal | Mostly plants | Various algae | Various algae | Cyano bacteria | Cyano bacteria |

As used herein, photosynthesis frequently occurs in plastids within the photosynthetic organism, such as chloroplasts in plants. Plastids are membrane-bound organelles containing photosynthetic pigments such as chlorophyll, situated within an organism's cells.

As used herein, the term "plant" refers to any green plant having chloroplasts for photosynthetic reactions.

In some embodiments, the plant includes fruiting, agricultural, and ornamental crops and the products thereof, including those selected from the group consisting of fruits, vegetables, trees, shrubs, flowers, grasses, roots, seeds, landscape plants, ornamental plants, agricultural plants and adornments and floriculture such as roses.

Plants as described herein may be collected and processed into a feedstuff (i.e., any edible substance that is ingestible by any animal such as grains, fruits, flowers, tubers, roots, vegetables, proteins, leaves, grasses etc.) or feedstock (i.e., any chemical or polymer feedstock used for industrial purposes such as hydrocarbons, sugars, alcohols, peptides, proteins, natural rubber, synthetics, bioethanol, biodiesel, biomass) or non-food crops used in a natural state (i.e., any non-food crop used for use as fuel, furniture, jewelry, perfumes, ornamental plants, or floriculture).

The plants described herein include agricultural plants of which a part or all is harvested or cultivated on a commercial scale or which serve as an important source of a feedstuff or feedstock as described above, fibers (e.g., cotton, linen), combustibles (e.g., wood) or other chemical compounds. Agricultural plants also encompass horticultural plants, i.e., plants that are grown in gardens (and not in fields), such as certain fruits and vegetables. Agricultural plants further include floriculture plants such as flowering plants, household plants, ornamental plants, or any such adornment-producing plant.

Examples of agricultural plants that are used as feedstuff or feedstock include soybean, corn (maize), wheat, triticale, barley, oats, rye, rape, such as canola/oilseed rape, millet (sorghum), rice, sunflower, cotton, sugar beets, pome fruit including apples, pears and quince, citrus, bananas, strawberries, blueberries, almonds, grapes, mango, *papaya*, peanuts, potatoes, tomatoes, peppers, cucurbits, cucumbers, melons, watermelons, garlic, onions, carrots, cabbage, beans, peas, lentils, alfalfa, trefoil, clovers, flax, herbs, grasses, lettuce, sugar cane, tea, tobacco and coffee.

Most photosynthetic organisms are plants. Plants are defined to be green plants (Viridiplantae in Latin), organisms belonging to the kingdom, Plantae. Multicellular groups such as flowering plants, conifers, ferns and mosses, and, depending on the definition, green algae, are included in Viridiplantae. Fruits, vegetables, and grains are considered to be plants.

Green plants have cell walls that include cellulose, and characteristically receive most of their energy from light via photosynthesis, utilizing chlorophyll which is contained in chloroplasts and gives them a green color. In some cases, plants that cannot produce normal amounts of chlorophyll or photosynthesize may be parasitic.

In some embodiments, the plant is grown on a farm, orchard, in a forest. In some embodiments, the plant produces a grain, fruit, vegetable, feedstuff, or feedstock. In some embodiments, the plant produces soybean, corn, wheat, barley, oats, rye, rape, millet, rice, sunflower, cotton, sugar beets, bananas, strawberries, blueberries, grapes, peanuts, potatoes, tomatoes, peppers, cucurbits, cucumbers, melons, watermelons, garlic, onions, carrots, cabbage, beans, peas, lentils, alfalfa, trefoil, clovers, flax, herb, grass, lettuce, sugar cane, tea, tobacco, or an adornment or floriculture, such as flowering plants, household plants, ornamental plants, or any such adornment-producing plant, including plants used in the production of flavorings, incense, fragrances and perfumes.

In some embodiments, the plant is a tree. Such trees include those produced for floriculture and ornamentation, for reforestation, for fuels, for soaps, perfume, furniture, and for feedstuff and feedstock. Examples of trees used for fuel include poplar, oak, pine and eucalyptus. Examples of trees used for their flower petals, leaves, bark, wood, seeds, roots, fruit rind, gums, and resins include sandalwood and ylang-ylang. Examples of trees used for reforestation, furniture and building materials include oak, pine and redwood. Examples of trees used for their fruits are citrus, pome fruit including apples, pears and quince, stone fruit such as peaches, mango, lychee, longan, mango, avocado, almonds, and macadamia nut. Examples of other trees grown for their fruit are coffee and *papaya*.

As used herein, the term "under a plant" or "placement under a plant" or in the "vicinity" of the plant, or "around a plant", or in the "proximity" of a plant refers to any distance between a plant and the articles described herein that can be traversed by photosynthetically active light that reaches the plant after being reflected by the article. For example, the article is placed "under a plant" or "around a plant" or in the "vicinity" of a plant or in the "proximity" of a plant when it is placed within, for example, 20 meters, 10 meters, 5 meters, 1 meter, 0.5 meter, 0.1 meter, or 0.01 meter of the plant, or a distance between any two of these values.

As used herein, the term "light that is photosynthetically active" is meant to encompass wavelengths of light approximately between about 400-750 nm.

As used herein, the term "light that is not photosynthetically active" is meant to encompass wavelengths of light that are roughly not between about 400-750 nm. For example, light that is not photosynthetically active generally includes light having wavelengths between about 300-400 nm (near ultra violet, NUV, band), between about 750 nm-1400 nm (the near infrared, NIR, band), and between about 1400-3000 nm (short-wave infrared, SWIR, band). In some embodiments, the reflective materials described herein convert light that is not photosynthetically active into light that is photosynthetically active. For example, light having wavelengths between 300-400 nm, that is not photosynthetically active, can be at least partially absorbed by the reflective materials described herein, and light having wavelengths between 400-

750 nm, that is photosynthetically active, may be subsequently fluoresced by the reflective materials described herein.

As used herein, the term "black body radiation" represents the upper limit to the amount of thermally induced radiation that a material may emit at a given temperature.

As used herein, a basic type of interaction between radiation (light) and matter is described by a photon transferring all of its energy to an atom or molecule. The energy of the photon raises an electron to a higher energy level or, in the case of a molecule, raises the molecule to a higher rotational or vibrational state. This increase in energy state of an atom or molecule may be reversed through scattering, emission, fluorescence or phosphorescence. For purposes herein, a molecule that has absorbed the energy of a photon is referred to as an "activated" molecule.

As used herein, the term "emit" is a measure of how strongly a body radiates at a given wavelength. One way to describe emission is as a mechanism by which molecular kinetic energy (thermal energy) may be converted into photons. Molecules may be activated by collisions with each other and the released energy emitted as photons.

As used herein, the term "absorb" refers to the light-absorbing features of the reflective layers and reflective materials described herein. The "absorption coefficient" of the reflective layers and reflective materials described herein determine how far light of a particular wavelength may penetrate into these reflective layers and reflective materials before being absorbed. For example, in reflective layers and reflective materials with a low absorption coefficient, light is poorly absorbed. The absorption coefficient depends on the composition of the reflective layers and reflective materials, and on the wavelength of light which is being absorbed.

As used herein, for a body in thermodynamic equilibrium, the amount of thermal energy emitted equals the energy absorbed.

As used herein, the term "scatter" refers to light that has been redirected and which exhibits diminished amplitude or intensity. A dissipation coefficient describes extent to which the amplitude or intensity of light diminishes, by scattering, upon the transmission of light through a given thickness of a scattering medium (e.g., fog). In some embodiments, scattering describes the mechanism for energy release in which the molecule may spontaneously transition back to its original state by emitting a photon identical to that absorbed; the photon remains part of the radiation field but its direction of propagation is diffused. In some embodiments, scattering describes the mechanism of diffuse reflection.

As used herein, the term "reflect," refers to light that has been redirected without a change in frequency. A reflection coefficient describes either the amplitude or the intensity of a reflected wave relative to an incident wave, and quantifies the proportion of energy that is reflected. Specular reflection is scattering in which the photon's direction of propagation is changed, but not diffused. For many surfaces, specularly reflected photons have an outgoing angle relative to the local perpendicular, which is equal to the incident angle. Examples of good reflectors are polished metals; polished metals such as nickel, gold and aluminum are superior infrared reflectors.

As used herein, the term "retro-reflect," refers to light that is substantially redirected back to its source, such as the sun or an artificial light.

As used herein, the term "diffuse reflect," refers to light that is, at least partially, randomly redirected. In some embodiments, diffuse reflected light includes some fraction of specularly reflected light or of retro-reflected light. In other embodiments, diffuse reflected light excludes retro-reflected light.

As used herein, a "metamaterial" generally features sub-wavelength elements, i.e., structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof.

Some exemplary metamaterials are described by J. A. Bowers et al., in published U.S. patent application No. 20120019892; R. A. Hyde et al., "Variable metamaterial apparatus," U.S. patent application Ser. No. 11/355,493; D. Smith et al., "Metamaterials," International Application No. PCT/US2005/026052; D. Smith et al., "Metamaterials and negative refractive index," Science 305, 788 (2004); D. Smith et al., "Indefinite materials," U.S. patent application Ser. No. 10/525,191; C. Caloz and T. Itoh, Electromagnetic Metamaterials: Transmission Line Theory and Microwave Applications, Wiley-Interscience, 2006; N. Engheta and R. W. Ziolkowski, eds., Metamaterials: Physics and Engineering Explorations, Wiley-Interscience, 2006; and A. K. Sarychev and V. M. Shalaev, Electrodynamics of Metamaterials, World Scientific, 2007.

In some embodiments a metamaterial may include a layered structure. In this sense, the "layers" of a metamaterial are distinct from the "layers" of an article. As such, a multilayered metamaterial may be included within one or more layers of an article. For example, embodiments may provide a metamaterial having a succession of adjacent layers, where the layers have a corresponding succession of material properties that include electromagnetic properties (such as permittivity and/or permeability). The succession of adjacent layers may be an alternating or repeating succession of adjacent layers, e.g., a stack of layers of a first type interleaved with layers of a second type, or a stack that repeats a sequence of three or more types of layers. When the layers are sufficiently thin (e.g., having thicknesses smaller than an operating wavelength of the metamaterial), the layered metamaterial structure may be characterized as an effective continuous medium having effective constitutive parameters that relate to the electromagnetic properties of the individual metamaterial layers.

Additional metamaterials having a positive permittivity include but are not limited to: semiconductors (e.g., at frequencies higher than a plasma frequency of the semiconductor) and insulators such as dielectric crystals (e.g., silicon oxide, aluminum oxide, calcium fluoride, magnesium fluoride), glasses, ceramics, and polymers (e.g., photoresist, PMMA). In some embodiments a positive permittivity material is a gain medium. Examples of gain media include semiconductor laser materials (e.g., GaN, AlGaAs), doped insulator laser materials (e.g., rare-earth doped crystals, glasses, or ceramics), and Raman gain materials. Materials having a negative permeability include but are not limited to: ferrites, magnetic garnets or spinels, artificial ferrites, and other ferromagnetic or ferrimagnetic. Materials having a negative permittivity include but are not limited to: metals (e.g., at frequencies less than a plasma frequency of the metal) including the noble metals (Cu, Au, Ag); semiconductors (e.g., at frequencies less than a plasma frequency of the semiconductor); and polar crystals (e.g., SiC, $LiTaO_3$, LiF, ZnSe) at frequencies within a restrahlen band of the polar crystal (G. Schvets, "Photonic approach to making a material with a negative index of refraction," Phys. Rev. B 67, 035109 (2003) and T. Tauber et al., "Near-field microscopy through a SiC superlens," Science 313, 1595 (2006).

As used herein, the terms "liquid crystal" and "liquid crystalline particle" are meant to describe a state of matter that has some properties of a conventional liquid and others of a solid crystal. For instance, a liquid crystal may flow like a liquid, but its molecules may be oriented in a crystal-like way. Liquid crystals include thermotropic and lyotropic liquid crystals. Thermotropic liquid crystals exhibit a phase transition, at a "phase transition temperature" or within a "phase transition temperature range," into a liquid crystal phase. Lyotropic liquid crystals exhibit phase transitions as a function of both temperature and concentration of the liquid crystals relative to a substrate.

In some embodiments, liquid crystals include thermochromic compounds or materials that reversibly change color due to a change in temperature. In some embodiments, the reflective article includes leuco dyes or thermochromic compounds or materials that reversibly change color due to a change in temperature. Typically, thermochromic materials display a reversible change of color at a specific temperature. Classes of thermochromic materials include cholesteryl nonanoate and cyanobiphenyls. In some embodiments, the compositions and materials described herein can include a thermochromic material in an amount of about 0.01 wt. % to about 1 wt. %, about 1 wt. % to about 5 wt. %, about 5 wt. % to about 10 wt. %, about 10 wt. % to about 25 wt. %, or a range between and including any two of these values.

As used herein, the terms "photochromic" or "photochromic dye" are meant to describe compounds and materials that exhibit photochromism, which is the reversible transformation of a chemical species between two forms by the absorption of electromagnetic radiation, where the two forms have different absorption spectra. Typically, photochromic dyes display a reversible change of color upon exposure to light, as exemplified below.

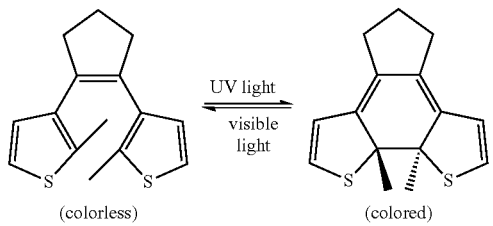 [SMILES: Cc1sccc1C1=C(c2ccsc2C)CCC1 ; C[C@@]12SC=CC1=C1CCCC1=C1C=CS[C@]12C]

(colorless)    (colored)

Classes of photochromic dyes include the spiropyrans, spirooxazines (e.g., leuco dye), diarylethenes (e.g., stilbene, dithienylethenes, as shown above), azobenzenes, photochromic quinones (e.g., phenoxynaphthacene quinone), and silver salts (e.g., silver chloride). The time required for a photochromic dye to complete its reversible transformation from a first chemical species to a second chemical species and back to the first chemical species is referred to as the "switch-back time." In some embodiments, the photochromic dye undergoes a permanent color (e.g., photo-reactive or photo-changeable) change upon exposure to ultraviolet or visible light radiation.

The amount of light absorbed by the photochromic dye can be referred to as the quantum yield of the photochromic dye. In some embodiments, the quantum yield of the dye will be fixed. In some embodiments, the quantum yield of the dye will vary depending upon environmental conditions. In some embodiments, the photochromic dye can revert between thermodynamic forms or isomers under certain conditions. Exemplary photochromic dyes are described in the published U.S. Patent Application No. 20050066453.

As noted, the present technology relates generally to a reflective article for reflecting photosynthetically active bands of sunlight towards one or more plants, and methods for growing plants where the method includes placing the reflective article under, around, or in the proximity of the plant.

In some embodiments, the reflective article reflects light that is not photosynthetically active with a reflection coefficient that increases as the temperature of the reflective layers and reflective materials increases or the quantity of incident light increases. The reflection coefficient can be calculated from methods and according to equations that are known in the art. For example, the reflective article may reflect sunlight that is not photosynthetcally active with a reflection coefficient that increases from about 5% to about 10%, from about 10% to about 25%, from about 25% to about 50%, or a range between and including any two of these values, as quantity of sunlight increases, for example, from morning until mid-day on clear day.

In some embodiments, the reflective article scatters incident light that is not photosynthetically active with a dissipation coefficient that increases as the temperature of the reflective article increases or the quantity of incident light increases. The dissipation coefficient can be calculated from methods and according to equations that are known in the art. For example, the reflective article may scatter sunlight that is not photosynthetically active with a dissipation coefficient that increases from about 5% to about 10%, from about 10% to about 25%, from about 25% to about 50%, or a range between and including any two of these values, as quantity of sunlight increases, for example, from morning until mid-day on a clear day.

In some embodiments, the decrease or increase of optical properties of the reflective article occurs abruptly within a temperature range of about 5° C. or 2° C. In some embodiments, the decrease or increase occurs gradually within a temperature range of greater than about 10° C. In some embodiments, the decrease or increase occurs gradually within a temperature range of greater than about 5° C.

In some embodiments, a fraction of sunlight having a wavelength between 300-400 nm, 750-1400 nm, or 1400-3000 nm is at least partially absorbed, reflected, or scattered by the reflective article at any given temperature. In some embodiments, the fraction is about 5% to about 10%, about 10% to about 25%, about 25% to about 50%, about 50% to about 75%, about 75% to about 100%, or a range between and including any two of these values. In some embodiments, the temperature is about 20° C., about 30° C., about 40° C., about 50° C., or a range between and including any two of these values. In some embodiments, at least 80% of the sunlight having wavelengths between 750 nm-1400 nm is at least partially absorbed, reflected, or scattered by the reflective layers and reflective materials at 27° C. In some embodiments, at least 80% of the sunlight having wavelengths between 1400-3000 nm is at least partially absorbed, reflected, or scattered by the reflective layers and reflective materials at 27° C. In some embodiments, at least 80% of the sunlight having wavelengths between 300-400 nm is at least partially absorbed, reflected, or scattered by the reflective article at 27° C.

In some embodiments, the reflective article described herein absorbs light that is not photosynthetically active and fluoresces light that is photosynthetically active. In some embodiments, incident light having wavelengths between 300-400 nm is at least partially absorbed by the reflective layers and reflective materials and light having wavelengths between 400-750 nm is fluoresced by the reflective layers and reflective materials.

In some embodiments, optical downconversion is used to increase the efficiency of the reflective article described herein. Optical downconversion converts ultraviolet (UV) light into visible light, which is used more efficiently by a solar cell. Similarly, UV light downconverted to visible light enhances photosynthetic activity in a photosynthetic organism.

In some embodiments, optical upconversion is used to increase the efficiency of the reflective article described herein. Upconversion of incoming radiation from the infrared spectrum into the photosynthetically useful regime of the electromagnetic spectrum would be very valuable; for example, a higher than average percentage of incoming solar radiation is infrared light. In one embodiment, the reflective layers and reflective materials include lanthanide-doped NaYF4 nanocrystals (NCs), used successfully in the upconversion of long wavelength radiation into the visible regime. (See *Nanoscale* (2010) Vol. 2, Iss. 5, pp 771-7, The Royal Society of Chemistry.) Because these nanoparticles have been shown to be readily dissolvable in water, it is foreseeable that such particles may be useful in the reflective article described herein such as photosynthetically enhancing upconverting reflective layers and reflective materials.

According to one aspect, the present technology provides a reflective article including one or more diffuse reflecting materials and one or more retro reflecting materials; where sunlight that is photosynthetically active is at least partially diffuse reflected by the article and sunlight that is not photosynthetically active is at least partially retro reflected by the article. In some embodiments, the article is for placement under, around, or in the proximity of the plant. In some embodiments, sunlight that is photosynthetically active is at least partially diffuse reflected towards leaves of a plant by the article, and sunlight that is not photosynthetically active is at least partially retro reflected away from the leaves of the plant by the article, when the article is in the vicinity of the plant. As such, at least some of the sunlight that is not photosynthetically active is retro reflected back towards the sun, whereas at least some of the sunlight that is photosynthetically active is diffuse reflected towards the plant.

Thermal radiation is the emission of electromagnetic waves from matter that has a temperature greater than absolute zero, and is the manifestation of the conversion of thermal energy into electromagnetic radiation. The characteristics of thermal radiation will depend on the properties of the surface it is emanating from, such as the surface's temperature, spectral absorptivity and spectral emissive power. Thermal radiation is not monochromatic radiation but is composed of a continuous dispersion of photon energies, i.e., a characteristic radiative spectrum. In addition to the definition provided above for a black body, additionally, an ideal black body is characterized as a radiating body and surface in thermodynamic equilibrium, where the surface of the black body has perfect absorptivity at all wavelengths, and where such a body is defined to be a perfect emitter. Non-ideal black bodies emit less thermal radiation at a given temperature than an ideal black body, and are generally characterized by an emissivity coefficient (multiplying the amount of radiation which would be emitted from an ideal black body) of between zero and one. A low emissivity material can be characterized by an emissivity less than 0.75, less than 0.50, less than 0.25, or less than 0.10. A black body therefore (whether or not ideal) is an example of a body which is a thermal radiator and that has a radiative spectrum.

The total amount of radiation of all frequencies emitted by a body or surface increases as a power of 4 when the temperature rises, e.g., it behaves as a $T^4$ function, where $T$ is the absolute temperature of the body. The rate of electromagnetic radiation emitted at a given frequency will be proportional to the amount of absorption; for example, a surface that absorbs more red light will thermally radiate more red light. These characteristics will hold for the wavelength (color), direction, polarization and also coherence of the light wave. Therefore, the character of the thermal radiation may be made to be polarized, coherent, and directional.

The emissivity of a material in general does not depend on its thickness.

Most natural materials do not have thermal emissivities that correspond to a given visual emissivity (e.g., color of the object). The exceptions are shiny metallic surfaces which possess low emissivities both in the visible and far infrared. An example of this type of material is the multi-layer insulation that is used in spacecraft; such surfaces may be used to reduce heat transfer in both directions (incoming and outgoing radiation to a surface).

In some embodiments, the reflective article includes a low emissivity film, configured to reduce thermal radiation, e.g., to prevent excessive drop in ground temperature during the night. In some embodiments, the reflective article is combined with a thermal insulator, which acts to reduce thermal conduction between the underlying ground and the overlying air, reducing heat loss from convection and thermal radiation. The insulator may comprise a low conductivity material (e.g., foam or fibrous material), or may comprise multi-layer insulation (MLI).

An example of a low emissivity film is Solar Gard Silver Ag 25 Low-E film, which when used on windows will provide Summer/Winter insulation. It traps indoor heat from escaping through the film and prevents far infrared radiation from entering a room through the film, transmitting 22% of the visible light incoming and rejecting 77% of the solar energy. Films like these work by reflecting the infra-red component of solar energy and absorbing the UV component. Typical absorptions for such silvered films are 65% for visible and infra-red light, and 99% for UV. A similar material layer would be useful in the reduction of heating of soil surrounding and covering roots of plants, trees and other photosynthetic organisms. A suitably designed low emissivity film layer could also be used to keep the ground warm during cold weather conditions.

Such material might also be used to reduce water loss through ground evaporation. Likewise, condensation under the ground cover may be reduced by the use of an insulating film or similar material that limits the heat flow beneath the material layer, preventing the propagation of mold, fungus or similar organisms that adversely affect plant growth.

In some embodiments, the reflective article consists of a single layer. In some embodiments, the reflective article includes two or more layers. In some embodiments, one layer comprises the diffuse reflecting material and the retro reflecting materials. In some embodiments, one layer comprises the diffuse reflecting material, and another layer comprises the retro reflecting materials.

In some embodiments, each of the one or more layers further comprises a polymer. In some embodiments, the polymer is biodegradable. In some embodiments, the polymer is a naturally occurring biodegradable polymer (e.g., polysaccharide-based). In some embodiments, the polymer is a synthetic biodegradable polymer (e.g., such as those described in *Synthetic Biodegradable Polymers: Advances in Polymer Science*, Rieger, B.; Künkel, A.; Coates, G. W.; Reichardt, R.;

Dinjus, E.; and Zevaco, Th. A. (Eds.) 2012, Vol. 245, Springer). In some embodiments, the polymer is polyester, polyolefin, polyamide, polycarbonate, or a combination thereof.

Light transmissible polymeric materials may be used to produce the reflective articles (e.g., one or more of the layers of diffuse reflecting material and/or retro reflecting material) described herein. In some embodiments, the polymeric materials can transmit at least 60, 70, 80 or 90 percent of the intensity of the light incident upon it at a given wavelength.

In some embodiments, the reflective article comprises a metal or metallic material. In some embodiments, the metal is stainless steel or aluminum. In some embodiments, the reflective article comprises aluminized Mylar®. In some embodiments the reflective article comprises a foil or sheet. In some embodiments, the reflective article comprises Viagrow™ Lightite Diamond Reflective Mylar Film. In some embodiments, the reflective article comprises a double wavelength-reflective multi-layer film, such as that described in USPTO Patent Applications 2013/0017382 and 2010/0132756. In some embodiments, the reflective article comprises a Panda film. In some embodiments, the reflective article comprises a GORE® Diffuse Reflector Product.

In some embodiments, the reflective article acts in the near-IR, visual light, and UV. In some embodiments, the reflecting material is a diffuse reflector.

In some embodiments of the article, reflection occurs primarily at the surface of the reflective material. In some embodiments of the article, reflection occurs primarily by volumetric scattering throughout the reflective material.

In some embodiments, the reflective article may contain a crystal or crystalline material. Such crystals or crystalline material may either occur naturally in nature or be made synthetically. Examples are diamond and quartz.

In some embodiments, the crystalline material may be on the surface, embedded within, or beneath a layer of the reflective article. In such embodiments, the layer may be an opaque, translucent or transparent material.

In some embodiments, the reflective articles are made from one or more polymers that are (a) relatively hard and rigid, (b) have a relatively low elastic modulus for easy bending, curling, flexing, etc. or (c) a combination thereof.

For example, in some embodiments, the polymeric materials that are used to make the corner-cube retro-reflector elements of the retro reflecting material are relatively hard and rigid. The polymeric materials may be, for example, thermoplastic or crosslinkable resins. The elastic modulus of such polymers may be, e.g., greater than about $10 \times 10^8$ or $13 \times 10^8$ pascals.

Examples of thermoplastic polymers that may be used to make the corner-cube retro-reflector elements of the retro reflecting material include acrylic polymers such as poly(methyl methacrylate); polycarbonates; cellulosics such as cellulose acetate, cellulose (acetate-co-butyrate), cellulose nitrate; epoxies; polyurethanes; polyesters such as poly(butylene terephthalate), poly(ethylene terephthalate); fluoropolymers such as poly(chlorofluoroethylene), poly(vinylidene fluoride); polyvinyl halides such as poly(vinyl chloride) or poly(vinylidene chloride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain less than 10 weight percent of silicone) such as silicone polyamide and silicone polycarbonate; fluorine modified polymers such as perfluoropoly(ethyleneterephthalate); ethylenically unsaturated compounds and resins including styrene, divinylbenzene, vinyl toluene, N-vinyl pyrrolidone, N-vinyl caprolactam, monoallyl, polyallyl, and polymethallyl esters such as diallyl phthalate and diallyl adipate, and amides of carboxylic acids such as and N,N-diallyladipamide; cationically polymerizable materials include but are not limited to materials containing epoxy and vinyl ether functional groups; and mixtures of the above polymers such as a poly(ester) and poly(carbonate) blend, a fluoropolymer and acrylic polymer blend.

Further examples of relatively hard and rigid thermoplastic polymers that may be used to make the corner-cube retro-reflector elements of the retro reflecting material are listed in U.S. Pat. No. 5,840,405 to J. M. Shusta et al., "Glittering cube-corner retroreflective sheeting."

In some embodiments, the portions and layers of the reflective articles, exclusive of the corner-cube retro-reflector elements, may be made from any of the above-described polymers used to make the corner-cube retro-reflector elements.

Additionally, in other embodiments, the portions and layers of the reflective articles, exclusive of the corner-cube retro-reflector elements, may include a low elastic modulus polymer for easy bending, curling, flexing, conforming, or stretching, and for allowing the corner-cube retro-reflector elements to become reoriented when the reflective article is exposed to heat and pressure. The elastic modulus may be less than $5 \times 10^8$ pascals, and may also be less than $5 \times 10^8$ pascals.

Representative low elastic modulus polymers for optional use in one or layers of the reflective article include: fluorinated polymers such as: poly(chlorotrifluoroethylene); poly(tetrafluoroethylene-co-hexafluoropropylene); poly(tetrafluoroethylene-co-perfluoro(alkyl)vinylether); and poly(vinylidene fluoride-co-hexafluoropropylene); low density polyethylenes such as: low density polyethylene; linear low density polyethylene; and very low density polyethylene; plasticized vinyl halide polymers such as plasticized poly(vinyl chloride); polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, and poly(ethylene-co-vinylacetate); and aliphatic and aromatic polyurethanes.

Further examples of low elastic modulus polymer that may be used to make the reflective articles described herein are listed in U.S. Pat. No. 5,840,405 to J. M. Shusta et al.

In some embodiments, the article, including the diffuse reflective or retro reflecting material, is permeable to gas transfer between the atmosphere and the ground.

The retro reflecting material and diffuse reflecting material can be separately incorporated into the reflecting article (e.g., as retro reflecting materials or particles and diffuse reflecting materials or particles within separate layers), or the retro reflecting material and diffuse reflecting material can be co-integrated (e.g., as retro reflecting materials or particles and diffuse reflecting materials or particles within the same layer), into the reflecting article (e.g., a single-layer or multi-layered film, sheet, ground cover, billboard, screen, mesh, curtain, or a covering for a scaffold or pre-existing structure such as the side of a building).

In some embodiments, the reflective article includes one or more layers of diffuse reflecting material; and one or more layers of retro reflecting material. In some embodiments, one layer of diffuse reflecting material is mounted on top of one layer of retro reflecting material. In some embodiments, one layer includes the diffuse reflecting material and the retro reflecting material.

In some embodiments, the one or more diffuse reflecting materials include a metamaterial, liquid crystal, photochromic material, thermochromic material, or a combination thereof.

In some embodiments, the one or more retro reflecting materials include a metamaterial, liquid crystal, photochromic material, thermochromic material, or a combination thereof.

In some embodiments, the one or more retro reflecting materials comprise a photochromic material, a thermochromic material, a metal, or a combination thereof.

In some embodiments, the metamaterial comprises a semiconductor, insulator, glass, ceramic, or polymer. In some embodiments, the metamaterial comprises a layered structure. In some embodiments, the compositions and materials described herein can include one or more metamaterials in an amount of about 0.01 wt. % to about 1 wt. %, about 1 wt. % to about 5 wt. %, about 5 wt. % to about 10 wt. %, about 10 wt. % to about 25 wt. %, about 25 wt. % to about 50 wt. %, or a range between and including any two of these values.

In some embodiments, the liquid crystalline particle comprises a liposome, apatone, and cholesteryl ester derivative (e.g., cholesteryl nonanoate), cyanobiphenyl derivative, or a combination thereof. In some embodiments, the liquid crystalline particles are thermotropic. In some embodiments, the liquid crystalline particle has a phase transition temperature of about 0° C. to about 10° C., about 10° C. to about 20° C., about 20° C. to about 30° C., about 30° C. to about 40° C., about 40° C. to about 50° C., or a range between and including any two of these values. In some embodiments, the liquid crystalline particle has a phase transition temperature of about 20° C. to about 30° C. In some embodiments, the compositions and materials described herein can include one or more liquid crystalline particles in an amount of about 0.01 wt. % to about 1 wt. %, about 1 wt. % to about 5 wt. %, about 5 wt. % to about 10 wt. %, about 10 wt. % to about 25 wt. %, about 25 wt. % to about 50 wt. %, or a range between and including any two of these values.

In some embodiments, the photochromic dye comprises, for example, a spiropyran, spirooxazine, triarylmethane, diarylethene, azobenzene, silver salt, stilbene, azastilbene, nitrone, fulgide, naphthopyran (e.g., 2H-naphthopyran or 3H-naphthopyran), quinone, anthrocyanin, or a combination thereof. In some embodiments, the photochromic dye has a switch-back time of about 10 to about 500 seconds, about 500 to about 1,000 seconds, about 1,000 to about 5,000 seconds, or a range between and including any two of these values. In some embodiments, the photochromic dye has a switch-back time of about 500 to about 1,500 seconds. In some embodiments, the photochromic dye has a switch-back time of about 900 to about 1,100 seconds. In some embodiments, the compositions and materials described herein can include one or more photochromic dyes in an amount of about 0.01 wt. % to about 1 wt. %, about 1 wt. % to about 5 wt. %, about 5 wt. % to about 10 wt. %, about 10 wt. % to about 25 wt. %, about 25 wt. % to about 50 wt. %, or a range between and including any two of these values.

In some embodiments, the retro reflecting material comprises a metal. In some embodiments, the metal is stainless steel or aluminum. In some embodiments, the retro reflecting material comprises aluminized Mylar®. In some embodiments the retroreflective material is a foil.

In some embodiments, any of the reflective articles described herein may include a retro reflecting material that, itself, includes corner-cube retro-reflectors (e.g., cube-shaped corners). In some embodiments, the corner-cube retro-reflectors are about 0.001 cm to about 0.1 cm wide. In some embodiments, the corner-cube retro-reflectors are about 0.01 cm wide. In some embodiments, the retro reflecting material comprises a metal. In some embodiments, the metal is stainless steel or aluminum. In some embodiments, the retro reflecting material comprises aluminized Mylar®. In some embodiments, the retro reflecting material retro-reflects sunlight with an efficiency that is greater when the sun is at its zenith in the sky than when the sun is not at its zenith on the same day. In some embodiments, the retro reflecting material retro-reflects sunlight with an efficiency that is at least 10% greater at noon than its efficiency at 9 am or 3 pm on the same day.

In some embodiments, the efficiency with which sunlight is retro reflected by the article increases with at least one of: the temperature of the article and the quantity of sunlight that contacts the article.

In some embodiments, the reflective article retro reflects sunlight that is not photosynthetically active with a retro reflection coefficient that increases as the temperature of the reflective article increases or the quantity of sunlight increases. The retro reflection coefficient can be calculated from methods and according to equations that are known in the art. For example, the reflective article may retro reflect sunlight that is not photosynthetically active with a reflection coefficient that increases from about 0% to about 5%, from about 5% to about 10%, from about 10% to about 25%, from about 25% to about 50%, from about 50% to about 75%, from about 75% to about 100%, or a range between and including any two of these values, as quantity of sunlight increases, for example, from morning until mid-day on clear day.

In further embodiments, the reflective article absorbs sunlight that is not photosynthetically active with an absorption coefficient that increases as the temperature of the reflective article increases or the quantity of sunlight increases. The absorption coefficient can be calculated from methods and according to equations that are known in the art. For example, the reflective article may absorb sunlight that is not photosynthetically active with an absorption coefficient that increases from about 0% to about 5%, from about 5% to about 10%, from about 10% to about 25%, from about 25% to about 50%, from about 50% to about 75%, from about 75% to about 100%, or a range between and including any two of these values, as quantity of sunlight increases, for example, from morning until mid-day on clear day.

In some embodiments, the reflective article scatters sunlight that is not photosynthetically active with a dissipation coefficient that increases as the temperature of the reflective article increases or the quantity of sunlight increases. The dissipation coefficient can be calculated from methods and according to equations that are known in the art. For example, the reflective article may scatter sunlight that is not photosynthetically active with a dissipation coefficient that increases from about 0% to about 5%, from about 5% to about 10%, from about 10% to about 25%, from about 25% to about 50%, from about 50% to about 75%, from about 75% to about 100%, or a range between and including any two of these values, as quantity of sunlight increases, for example, from morning until mid-day on clear day.

In some embodiments, the decrease or increase occurs abruptly within a temperature range of about 10° C., about 5° C., or about 2° C. In some embodiments, the decrease or increase occurs gradually within a temperature range of greater than about 10° C., or within a temperature range of greater than about 5° C.

In some embodiments, the sunlight that is diffuse reflected has an angle of reflection from about 1 to about 179 degrees, from about 1 to about 160 degrees, from about 1 to about 120 degrees, from about 1 to about 90 degrees, from about 1 to about 60 degrees, from about 1 to about 45 degrees, from about 1 to about 30 degrees, from about 1 to about 15 degrees, from about 1 to about 5 degrees, or a range between and including any two of these values, relative to the angle of incidence of the sunlight.

In some embodiments, sunlight having wavelengths between 400-750 nm, or a combination thereof, is substantially diffuse reflected by the reflective article; and sunlight having wavelengths that are not between 400-750 nm is at least partially retro reflected by the reflective article.

In some embodiments, the diffuse reflecting material comprises diffuse reflecting particles having a diameter of less than about 100 µm. In some embodiments, the diffuse reflecting material comprises diffuse reflecting particles having a diameter of less than about 1 µm. In some embodiments, the diffuse reflecting particles are thermochromic. In some embodiments, the diffuse reflecting particles further comprise plastic or $SiO_2$.

In some embodiments, a fraction of sunlight having a wavelength of 400-750 nm is substantially diffuse reflected by the reflective article at any given temperature. In some embodiments, the fraction is from about 5% to about 25%, about 25% to about 50%, about 50% to about 75%, about 75% to about 100%, or a range between and including any two of these values. In some embodiments, the temperature is about 20° C., about 30° C., about 40° C., about 50° C. or a range between and including any two of these values. In some embodiments, at least 80% of the sunlight having wavelengths between 400-750 nm, or a combination thereof, is substantially diffuse reflected by the reflective article at 27° C.

In some embodiments, a fraction of sunlight having a wavelength between 300-400 nm, 750-1400 nm, or 1400-3000 nm is at least partially retro reflected by the reflective article at any given temperature. In some embodiments, the fraction is from about 25% to about 50%, about 50% to about 75%, about 75% to about 100%, or a range between and including any two of these values. In some embodiments, the temperature is about 20° C., about 30° C., about 40° C., about 50° C., or a range between and including any two of these values. In some embodiments, at least 80% of the sunlight having wavelengths between 750 nm-1400 nm is at least partially retro reflected by the reflective article at 27° C. In some embodiments, at least 80% of the sunlight having wavelengths between 1400-3000 nm is at least partially retro reflected by the reflective article at 27° C. In some embodiments, at least 80% of the sunlight having wavelengths between 300-400 nm is at least partially retro reflected by the reflective article at 27° C.

As noted above, the term "retro-reflectors," as used herein, include devices that operate by returning light back to the light source along the same light direction with a minimum of scattering. For example, an electromagnetic wave front is reflected by a retroreflector back along a vector parallel to but opposite in direction from the incident wave's source. The retroreflector's angle of incidence is greater than zero. This is dissimilar to a planar mirror, which does this only if the mirror is exactly perpendicular to the wave front, having a zero angle of incidence.

In some embodiments, the reflective articles described herein include a retro-reflective material such as a film or sheeting that has a generally planar front surface and an array of prismatic corner-cube retro-reflective elements protruding from a layer or the back surface of the film or sheet, such as those shown in FIGS. 1B and 2B.

In some embodiments, the reflective articles comprise microprismatic elements. In some embodiments, the retro reflective elements include corner cube reflectors.

In a corner cube retro reflector, three mutually perpendicular reflective surfaces, are emplaced to form the corner of a cube. The three corresponding normal vectors of the corner's sides form a basis (x, y, z) that represent the direction of an arbitrary incoming light ray, [a, b, c]. When the ray reflects from the first side, x, the ray's x component, a, is reversed to −a while the y and z components remain unchanged. As the ray reflects first from side x then from side y and finally from side z the ray direction goes from [a, b, c] to [−a, b, c] to [−a, −b, c] to [−a, −b, −c]. It leaves the corner with all three components [a, b, c] exactly reversed.

Corner reflectors occur in two varieties. In the first case, the corner is literally the truncated corner of a cube of transparent material such as conventional optical glass (FIG. 4A). In this type of structure, the reflection is achieved by total internal reflection or by silvering of the outer cube surfaces. The second form of a corner reflector simply uses mutually perpendicular flat mirrors bracketing an air space. Both types have similar optical properties.

Large relatively thin retro reflectors may be formed by combining many small corner reflectors, using the standard optimal packing of the plane with congruent triangles.

Another form of retro reflector is used to reflect light from road signs and roadways into a driver's eyes rather than back into a car's headlights (FIG. 4B). This type of retro reflector consists of refracting optical elements with a reflective surface, so that the focal surface of the refractive element coincides with the reflective surface, typically a transparent sphere and a spherical mirror. This effect can also be optimally achieved with a single transparent sphere where the refractive index of the material is exactly two times the refractive index of the medium from which the radiation is incident. In the latter case, the sphere surface behaves like a concave spherical mirror with the required curvature for retro reflection. The refractive index does not need to be twice the ambient if it is greater than 1.5 times as high; there exists a radius from the centerline due to spherical aberration at which incident rays are focused at the center rear surface of the sphere.

Such a retroreflector may consist of many small versions of these structures incorporated into a thin sheet or in paint. In the case of glass beads in paint, the paint glues the beads to the surface where retroreflection is required. The beads protrude as their diameter is chosen to be about twice the thickness of the paint.

A third and less common way of producing a retroreflector is to use the nonlinear optical phenomenon called phase conjugation. This technique may be used in advanced optical systems such as high-power lasers and optical transmission lines, Phase-conjugate mirrors require a comparatively expensive and complex apparatus, as well as large quantities of power (as nonlinear optical processes can be efficient only at high enough intensities). Phase-conjugate mirrors have an inherently much greater accuracy in the direction of the retro reflection, which in passive elements is limited by the mechanical accuracy of the construction.

In a non-limiting embodiment, the retroreflector may be a corner reflector. In some embodiments, the corner reflectors are suitable for sending the light back to the source over long distances.

In some embodiments, the reflective articles described herein include a retro-reflective material such as a film or sheeting that includes prismatic corner-cube retro-reflecting elements such as those used in signing applications, including signing for traffic control. Exemplary retro-reflective materials, such as films or sheetings are described, e.g., in U.S. Pat. No. 4,703,999 to G. M. Benson, "Wide-angle-reflective cube-corner retroreflective sheeting;" published U.S. patent application No.: US 2010/0195205 to H. D. Kim, "Cube-corner type self-reflection sheet having improved tensile strength;" published European Patent App. No.: EP 2431774 to K. Amemiya et al., "Hexagonal corner cube retroreflective article;" U.S. Pat. No. 6,114,009 to K. L. Smith et al., "Asymmetric retroreflective cube corner sheeting mold and sheeting formed therefrom;" U.S. Pat. No. 6,390,629 to I. Mimura et al., "Triangular-pyramidal cube-corner retroreflection sheet;" Published International PCT Application No.: WO1995/011464A2 to A. C. Bacon et al., "Ultra-flexible retroreflective cube corner composite sheetings and methods of manufacture;" and U.S. Pat. No. 5,840,405 to J. M. Shusta et al., "Glittering cube-corner retroreflective sheeting."

In use, the reflective article and, in particular, the retroreflective material of the reflective article, is arranged with the front surface disposed generally toward the anticipated location of incident light. Light incident to the front surface enters the reflective article, passes through its single or multiple layers. According to certain embodiments, photosynthetically active light is diffuse reflected, whereas photosynthetically inactive light is retro reflected.

In one embodiment as shown in FIG. 1B, such as at midday when sunlight is most intense, nearly all of the light that is not photosynthetically active is internally reflected by the faces of the cube-corner retro reflective elements so as to exit the front surface in a direction substantially toward the light source. This is referred to as retro reflection. The light rays are typically reflected at the cube faces due either to total internal reflection (TIR) from interfaces with an intentionally entrapped medium of greatly different refractive index, such as air, or to reflective coatings, such as vapor deposited aluminum.

In another embodiment as shown in FIG. 2B, during the early morning or late afternoon when sunlight is less intense, some of the light that is not photosynthetically active also diffuse reflected with the photosynthetically-active wavelengths towards the leaves or a plant to warm the plant.

In some embodiments, the retro reflecting material includes corner-cube retro-reflectors. In some embodiments, the corner-cube retro-reflectors are about 0.001 cm to about 0.1 cm wide. In some embodiments, the corner-cube retro-reflectors are about 0.01 cm wide.

In some embodiments, the reflective article includes diffuse reflecting particles having a diameter of less than about 500 µm, about 100 µm, about 50 µm, about 10 µm, about 1 µm, or a range between and including any two of these values. In some embodiments, the reflective article includes diffuse reflecting particles having a diameter of less than about 100 µm. In some embodiments, the reflective article includes diffuse reflecting particles having diameters of about 755 nm-1405 nm, about 1405-3005 nm, or about 305-405 nm. In some embodiments, the diffuse reflecting particle sizes and diffuse reflecting particle size distributions, as used herein, can be measured with a Micromeritics Sedigraph 5100 Particle Size Analyzer. In some embodiments, the articles described herein are powdered, dissolved or suspended in a liquid, or presented in a dry powdered state before doing a particle size analysis. X-ray scattered data can be recorded and converted to particle size distribution curves by one of ordinary skill in the art.

In some embodiments, the diffuse reflecting particles are thermochromic. In some embodiments, the diffuse reflecting particles include plastic or $SiO_2$. The plastic can include polypropylene, polyethylene, or other such polymers or co-polymers thereof.

In some embodiments, the density of the diffuse reflecting material and/or the retro reflecting material is consistent throughout the reflective article. Thus, the article can be substantially homogenous. In other words, the diffuse reflecting material and/or the retro reflecting material can be consistently distributed throughout the reflective article.

In some embodiments, the density of the diffuse reflecting material and/or the retro reflecting material is inconsistent throughout the reflective article. In other words, the diffuse reflecting material and/or the retro reflecting material can be inconsistently distributed throughout the reflective article. Thus, the article can also vary, for example, by increasing the density of the diffuse reflecting material in areas of the article that are closest to the plant or areas which are exposed to maximum sunlight. Alternatively, the article can also vary, for example, by increasing the density of the diffuse reflecting material in areas of the article that are relatively distant from the plant or areas which are exposed to minimum sunlight.

The reflective article can be incorporated into any device that can be placed in the proximity of a plant. For example, in some embodiments, the reflective article is a ground cover. In some embodiments, the reflective article is a film, foil or a sheet, billboard, screen, mesh, curtain, or a covering for a scaffold or for a pre-existing structure such as the side of a building. In some embodiments, the reflective article can be incorporated into a device that rotates or moves vertically and laterally.

In some embodiments, the reflective article is a ground cover. In some embodiments, the ground cover diffuse reflects sunlight that is photosynthetically active towards the leaves of a plant, and retro reflects sunlight that is not photosynthetically active away from the leaves of the plant. In some embodiments, the plant yields soybean, corn, wheat, triticale, barley, oats, rye, rape, millet, rice, sunflower, cotton, sugar beets, pome fruit, stone fruit, citrus, bananas, strawberries, blueberries, almonds, grapes, mango, *papaya*, peanuts, potatoes, tomatoes, peppers, cucurbits, cucumbers, melons, watermelons, garlic, onions, carrots, cabbage, beans, peas, lentils, alfalfa, trefoil, flax, grass, lettuce, sugar cane, tea, tobacco or coffee.

The article, such as a ground cover, may be rolled out in lengths onto the ground between under, around or in the proximity of rows of trees in an orchard, for example, rows of vines in a vineyard, or rows of fruits or vegetables to increase the amount of photosynthetically active sunlight to which the plants are exposed. In addition to reflecting photosynthetically active sunlight, the article may also retain moisture, suppress weeds, or warm soil. Each length of the article, such as a ground cover, may be suitably secured in place such that it will not be dislodged during wind or movement of traffic over the article. For example, a fastening system including a multiple number of prong fastening components may be fixed to the edges or side margins of the sheet material by pushing the prongs of the fastening components into the material so that prongs pierce and pass through the material. In turn the prongs may be fixed to adjacent trees, or alternatively stakes or pegs anchored into the soil. The article, such as a ground cover, will typically remain in place for some months, before being removed and optionally reused in a subsequent growing season or on another crop in the same growing season. Alternatively, the article, such as a ground cover, may be made from biodegradable materials and, thus, may be secured in place and allowed to gradually decompose.

The reflective article may be permeable to gas transfer between the atmosphere and the ground.

The reflective article may also include one or more agents which strengthen and/or improve the weather-resistance of the article. For example, such agents may include at least one light or heat stabilizer which will increase the resistance of the article to degradation through exposure to solar radiation and temperature in an external environment, such as the following products, by BASF (Ludwigshafen, Germany), sold under the following registered (®) trademarks: Irganox 245, Irganox 259, Irganox 565, Irganox 1010, Irganox 1035, Irganox 1076, Irganox 1098, Irganox 1135, Irganox 1141, Irganox 1330, Irganox 1425, Irganox 1520, Irganox 3052, Irganox 3114, Irganox 5057, Irganox MD 1024, Irgafos 168, Irgafos DDPP, Irgafos P-EPQ, Irgafos TNPP, Irgafos TPP, Irganox PS 800, Irganox PS 802, Irganox B 215, Irganox B 225, Irganox B 551, Irganox B 561, Irganox B 612, Irganox B 900, Irganox B 921, Irganox B 1171, Irganox B 3557, Irganox B 3596, Irganox HP 3560, Irganox HP 2215, Irganox HP 2225, Irganox HP 2921, Ca 100, Chimassorb 119, Chimassorb 944, Nor 371, Tinuvin 123, Tinuvin 144, Tinuvin 622, Tinuvin 765, Tinuvin 770, Tinuvin 783, Tinuvin 791, Chimassorb 81, Tinuvin 213, Tinuvin 234, Tinuvin 320, Tinuvin 326, Tinuvin 327, Tinuvin 328, Tinuvin 329, Tinuvin 350, Tinuvin 360, Tinuvin 492, Tinuvin 494, Tinuvin 571, Tinvin 622, Tinvin 765, Tinuvin 1577, Tinuvin P, Tinuvin B 75, Tinuvin B 241, MD 1024, Araldite 7072, AO-I, Ni-Quencher, $TiO_2$ and Calcium Stearate. Additionally or alternatively, the articles may include at least one agent which increases the strength of the articles, such as the addition of strength enhancing polymers such as polyester, polypropylene, high density polyethylene, or linear low density polyethylene.

Sheets and films comprising the reflective articles described herein may be produced according to a number of known methods, including those disclosed in U.S. Pat. Nos. 5,450,235, 4,601,861, 4,486,363, 4,243,618, 3,811,983, 3,689,346, 8,262,237, and 5,691,846.

In some embodiments, one or more of the reflective article (s) and the plant(s) are connected to a computer or a memory storage device. The computer can be used, for example, to measure and monitor one or more of, for example, the plant's rate of photosynthesis, the plant's rate of growth, the amount of water that is consumed by the plant, or the plant's temperature, the time, air temperature, and the intensity of sunlight. The computer can further be used, for example, to adjust the reflective article to increase or decrease the efficiency with which sunlight that is not photosynthetically active is retro reflected by the reflective article. Non-limiting exemplary adjustments include rotating the reflective article or repositioning the reflective article by, for example, moving the reflective article horizontally or vertically. Further non-limiting exemplary adjustments to the reflective article include increasing or decreasing the efficiency of materials or components within the reflecting article, such as the retro reflecting material. Such adjustments can be used to increase or decrease the efficiency with which the sunlight that is not photosynthetically active is at least partially retro reflected by the reflecting article.

In some embodiments, the plant is a tree, shrub, flower, grass, root, seed, landscape plant or an ornamental plant. In some embodiments, the plant yields a fruit, vegetable, or nut. In some embodiments, the plant is a tree, such as a fruit tree.

In some embodiments, the plant is selected from the group consisting of a plant or tree that yields soybean, corn (maize), wheat, triticale, barley, oats, rye, rape, such as canola/oilseed rape, millet (sorghum), rice, sunflower, cotton, sugar beets, pome fruit, stone fruit, citrus, bananas, strawberries, blueberries, almonds, grapes, mango, *papaya*, peanuts, potatoes, tomatoes, peppers, cucurbits, cucumbers, melons, watermelons, garlic, onions, carrots, cabbage, beans, peas, lentils, alfalfa (lucerne), trefoil, clovers, flax, elephant grass (*Miscanthus*), grass, lettuce, sugar cane, tea, tobacco or coffee.

According to one aspect, the present technology provides a method for growing a plant, the method including placing a reflective article beside or beneath the plant, where the reflective article includes one or more diffuse reflecting materials and one or more retro reflecting materials; where sunlight that is photosynthetically active is at least partially diffuse reflected, wavelength-dependently reflected, or retroreflectively reflected by the article and sunlight that is not photosynthetically active is at least partially diffuse reflected, partially wavelength-dependently reflected, or partially retroreflected by the article. In some embodiments, the method includes any of the reflective articles described herein. In some embodiments, when the article is under, around or in the proximity of a plant, sunlight that is photosynthetically active is at least partially diffuse reflected towards leaves of a plant by the article and sunlight that is not photosynthetically active is at least partially retro reflected away from the leaves of the plant by the article.

In some embodiments, the method further includes measuring one or more of the plant's rate of photosynthesis, the plant's rate of growth, the amount of water that is consumed by the plant, the type and rate of generated gases such as oxygen, or the plant's temperature.

In some embodiments, the method further includes adjusting the reflective article to increase or decrease the efficiency with which sunlight is reflected or retroreflected by the reflective article. For example, in some embodiments, the retro reflecting material is adjusted to retro-reflect sunlight with an efficiency that is greater when the sun is at its zenith in the sky than when the sun is not at its zenith on the same day.

In some embodiments, the plant's rate of photosynthesis is increased by about 1% to about 5%, about 5% to about 10%, about 10% to about 20%, about 20% to about 30%, about 30% to about 40%, about 40% to about 60%, about 60% to about 80%, about 80% to at least about 100%, or a range between and including any two of these values, after the placing step, during a period of time from about one day to about one week, from about one week to about one month, from about six months to about one year, from about one year to about five years, or a range between and including any two of these values.

In some embodiments, the plant's rate of growth is increased by about 1% to about 5%, about 5% to about 10%, about 10% to about 20%, about 20% to about 30%, about 30% to about 40%, about 40% to about 60%, about 60% to about 80%, about 80% to at least about 100%, or a range between and including any two of these values, after the placing step, during a period of time from about one day to about one week, from about one week to about one month, from about six months to about one year, from about one year to about five years, or a range between and including any two of these values.

In some embodiments, the amount of water consumed by the plant is reduced by about 1% to about 5%, about 5% to about 10%, about 10% to about 20%, about 20% to about 30%, about 30% to about 40%, about 40% to about 60%, about 60% to about 80%, or a range between and including any two of these values, after the placing step, during a period of time from about one day to about one week, from about one week to about one month, from about six months to about one year, from about one year to about five years, or a range between and including any two of these values.

In some embodiments, the plant's temperature is reduced by about 0° C. to about 1° C., about 1° C. to about 5° C., about 5° C. to about 10° C., about 10° C. to about 20° C., or a range between and including any two of these values, after the placing step, during a period of time from about one day to about one week, from about one week to about one month, from about six months to about one year, from about one year to about five years, or a range between and including any two of these values.

In some embodiments, the plant's temperature is increased by about 0° C. to about 1° C., about 1° C. to about 5° C., about 5° C. to about 10° C., about 10° C. to about 20° C., about 20° C. to about 30° C., or a range between and including any two of these values, after the placing step, during a period of time from about one day to about one week, from about one week to about one month, from about six months to about one year, from about one year to about five years, or a range between and including any two of these values.

In some embodiments, the reflective article is used as a ground cover to decrease the thermal emissivity of the ground that it covers. As such, the reflective article can be used to retain heat within the ground that surrounds the roots of a plant. In some embodiments, the reflective article decreases the thermal emissivity of the ground that it covers by about 1% to 10%, about 10% to about 25%, about 25% to about 50%, about 50% to about 75%, or about 75% to about 100%.

In some embodiments, the reflective article having a surface area is placed above soil having a surface area such that a fraction of the surface area of the soil is covered by the article and has a first temperature and a fraction of the surface area of the soil is uncovered by the article and has a second temperature and the first temperature exceeds the second temperature by at least about 1° C., 5° C., 10° C. or 20° C. In some embodiments, the reflective article changes the albedo of the ground in the vicinity of the plant.

In one exemplary embodiment, the reflective article includes a sheet made of a material which is smooth on its topside and irregular on its backside. The interface at the topside of the material is chosen to be substantially reflective to light with photosynthetically inactive wavelengths (e.g., due to a coating on the reflective article or due to the intrinsic properties of the reflective article), but substantially transparent to light with photosynthetically active wavelengths. The material is pressed into a corrugated shape to form an array of corner-cubes. Because the topside of the reflective article is smooth, it exhibits specular reflection for light with photosynthetically inactive wavelengths; and because the reflective article is shaped into corner-cubes, it exhibits retro-reflection. The reflective article is transparent to (at least) the photosynthetically active wavelengths, which pass through it towards the backside. The backside is reflective (e.g., due to a coating, or the material's intrinsic properties) at the photosynthetically active wavelengths, so it can reflect photosynthetically active light back through the topside of the article toward the plant. This reflection is inherently retro-reflective due to the corner-cube shape, but, because the backside of the reflective article is irregular, the reflection is diffuse. The backside irregularity can arise from thickness variations in the sheet forming the reflective article, or it can arise from adhering small particles to the backside of the reflective article.

The present technology, thus generally described, will be understood more readily by reference to the following Examples, which are provided by way of illustration and not intended to be limiting of the present technology.

EXAMPLES

Example 1

A non-limiting example of a reflective article as described herein, such as a sheet, can be made as follows:

Step 1: The retro reflective layer. The retro reflective layer can be made from a sheeting layer similar to that described, for example, in Example 1 of U.S. Pat. No. 5,691,846 to O. Benson Jr. et al., "Ultra-flexible retroreflective cube corner composite sheetings and methods of manufacture."

Step 2: The diffuse-reflective layer. An additional layer made of a diffuse reflecting material can be prepared from one of the light transmissible polymeric materials described herein, such as low density polyethylene, having between 0.01 wt % and 90 wt %, e.g., 5 wt % of a metamaterial, liquid crystal, photochromic material, thermochromic material or a combination thereof. The retro reflective layer and diffuse-reflective layer may be fused or applied according to methods known to those of skill in the art of making multilayered plastic sheeting.

The reflective articles and sheeting described herein are designed to retro-reflect substantially all of the photosynthetically inactive light, but diffuse reflect substantially all of the photosynthetically active light. This combination of retro-reflective and diffuse-reflective properties allows the reflective articles and sheeting described herein to be used as tools for enhancing photosynthesis in plants and improving agricultural crop yield in orchards, agricultural fields.

Example 2

Use of the Reflective Ground Cover Sheets Described Herein to Increase Crop Yields and Decrease the Volume of Water Used for Irrigation (A) One hundred apple trees ("treated trees") are surrounded with reflective ground cover sheets which are located as a ground cover under, around, in the proximity of the trees, as described herein, during a growing season. One hundred apple trees of the same variety, in the same orchard, are not surrounded with reflective ground cover sheets as described herein ("control trees"). The apples from all two hundred trees are harvested at the end of the growing season and the number of apples harvested from the treated trees is compared to the number of apples harvested from the control trees.

(B) Ten acres of corn ("treated corn field") plants are surrounded with reflective ground cover sheets or grown up through reflective ground cover, as described herein, during a growing season. Ten acres of corn of the same variety, in an adjacent plot, are not surrounded with reflective ground cover sheets as described herein ("control corn field"). The treated corn eventually grows to substantially overshadow the reflective ground cover sheets. The corn from both fields is harvested at the end of the growing season and the amount of corn harvested from the treated corn field is compared with the amount of corn harvested from the control corn field.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent reflective articles, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, reflective articles or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed:

1. A reflective article configured for placement under, around, or in the proximity of a plant, comprising:
    a first layer including reflecting material configured to diffusely reflect at least 80% of incident sunlight that is photosynthetically active; and
    a second layer including retro-reflecting material configured to retro-reflect at least 80% of incident sunlight that is non-photosynthetically active;
    wherein:
        the first layer covers the second layer such that the incident light strikes the first layer before reaching the second layer;
        the incident sunlight that is diffusely reflected excludes retro-reflecting the incident light;
        sunlight that is photosynthetically active corresponds to wavelengths from about 400 nm to about 750 nm.

2. The reflective article of claim 1 comprising two or more layers.

3. The reflective article of claim 2, wherein at least one layer comprises the reflecting material and at least another layer comprises the retro-reflecting material.

4. The reflective article of claim 1, wherein the retro-reflecting material comprises corner-cube retro-reflectors.

5. The reflective article of claim 4, wherein the corner-cube retro-reflectors are about 0.005 cm to about 0.1 cm wide.

6. The reflective article of claim 1, wherein the retro-reflecting material comprises a metal.

7. The reflective article of claim 6, wherein the metal is stainless steel or aluminum.

8. The reflective article of claim 1, wherein at least one of the materials comprises a low emissivity film.

9. The reflective article of claim 1, wherein the article comprises a thermal insulator.

10. The reflective article of claim 1, wherein the reflective article comprises a film, foil, or sheet.

11. The reflective article of claim 1, wherein an efficiency with which sunlight is retro-reflected by the retro-reflecting material increases with increasing temperature of the article or the quantity of sunlight that contacts the article.

12. The reflective article of claim 1, wherein the sunlight that is diffusely reflected has an angle of reflection between 1 and 90 degrees relative to the angle of incidence of the sunlight.

13. The reflective article of claim 1 further comprising a spectrally transparent layer of material having a substantially smooth top surface and a diffusely reflective bottom surface, wherein the spectrally transparent layer of material comprises an array of concave indentations.

14. The reflective article of claim 13, wherein the substantially smooth top surface is at least partially specularly reflective of sunlight that is not photosynthetically active.

15. The reflective article of claim 13, wherein the spectrally transparent layer of material is at least partially transparent to sunlight that is photosynthetically active.

16. The reflective article of claim 13, wherein the diffusively reflective bottom surface is at least partially reflective of sunlight that is photosynthetically active.

17. The reflective article of claim 13, wherein the spectrally transparent layer of material has an irregular thickness.

18. The reflective article of claim 13, wherein the diffusely reflective bottom surface comprises a rough surface.

19. The reflective article of claim 13, wherein the diffusely reflective bottom surface comprises reflective particles.

20. The reflective article of claim 13, wherein the concave indentations are shaped such that the top surface forms corner-cube retro-reflectors.

21. The reflective article of claim 13, wherein the layer of material is disposed on a substrate, such that the substantially rough bottom surface comprises an interface between the layer of material and the substrate.

22. The reflective article of claim 1, wherein the reflecting material is consistently distributed throughout the reflective article.

23. The reflective article of claim 1, wherein the reflecting material is inconsistently distributed throughout the reflective article.

24. The reflective article of claim 1, wherein the reflective article is a ground cover.

25. The reflective article of claim 1, wherein the reflective article is configured to reduce a thermal emissivity of the ground covered by the article.

26. The reflective article of claim 1, wherein the article is substantially permeable to gas transfer between the atmosphere and the ground.

27. The reflective article of claim 1, wherein one or more of the reflective article(s) and the plant(s) are connected to a computer or a memory storage device.

28. A method for growing a plant comprising placing a reflective article under, around, or in the proximity of the plant, wherein the reflective article comprises
   a first layer including reflecting material configured to diffusely reflect at least 80% of incident sunlight that is photosynthetically active; and
   a second layer including retro-reflecting material configured to retro-reflect at least 80% of incident sunlight that is non-photosynthetically active;
   wherein:
      the first layer covers the second layer such that the incident light strikes the first layer before reaching the second layer;
      the incident sunlight that is diffusely reflected excludes retro-reflecting the incident light; and
      sunlight that is photosynthetically active corresponds to wavelengths from about 400 nm to about 750 nm.

29. The method of claim 28, wherein an amount of water consumed by the plant is reduced by at least 10% after the article is placed.

30. The method claim 28, wherein the reflective article is placed over ground and a thermal emissivity of the ground is reduced by at least about 10%.

* * * * *